(12) United States Patent
Budden et al.

(10) Patent No.: US 11,481,629 B2
(45) Date of Patent: Oct. 25, 2022

(54) DISTRIBUTIONAL REINFORCEMENT LEARNING FOR CONTINUOUS CONTROL TASKS

(71) Applicant: DeepMind Technologies Limited, London (GB)

(72) Inventors: David Budden, London (GB); Matthew William Hoffman, London (GB); Gabriel Barth-Maron, London (GB)

(73) Assignee: DeepMind Technologies Limited, London (GB)

( * ) Notice: Subject to any disclaimer, the term of this patent is extended or adjusted under 35 U.S.C. 154(b) by 248 days.

(21) Appl. No.: 16/759,519

(22) PCT Filed: Oct. 29, 2018

(86) PCT No.: PCT/EP2018/079526
§ 371 (c)(1),
(2) Date: Apr. 27, 2020

(87) PCT Pub. No.: WO2019/081778
PCT Pub. Date: May 2, 2019

(65) Prior Publication Data
US 2020/0293883 A1  Sep. 17, 2020

Related U.S. Application Data

(60) Provisional application No. 62/578,389, filed on Oct. 27, 2017.

(51) Int. Cl.
*G06N 3/08* (2006.01)
*G06N 3/04* (2006.01)

(52) U.S. Cl.
CPC ............ *G06N 3/08* (2013.01); *G06N 3/0454* (2013.01)

(58) Field of Classification Search
CPC ........ G06N 3/08; G06N 3/0454; G06N 3/088; G06N 3/0445; G06N 7/005; G06N 3/006
USPC ........................................................ 706/23
See application file for complete search history.

(56) References Cited

PUBLICATIONS

Barth-Maron et al., "Distributed Distributional Deterministic Policy Gradients," https://arxiv.org/abs/1804.08617, Apr. 2018, 16 pages.
Bellemare et al., "A Distributional Perspective on Reinforcement Learning," https://arxiv.org/abs/1707.06887, Jul. 2017, 19 pages.
Glynn, "Likelihood Ratio Gradient Estimation for Stochastic Systems," Communications of the ACM, Oct. 1990, 33(10):75-84.
Hafner et al., "Reinforcement learning in feedback control," Machine Learning, Jul. 2011, 84(1-2):137-169.
Heess et al., "Emergence of Locomotion Behaviours in Rich Environments," https://arxiv.org/abs/1707.02286v2, Jul. 2017, 14 pages.

(Continued)

*Primary Examiner* — Thierry L Pham
(74) *Attorney, Agent, or Firm* — Fish & Richardson P.C.

(57) ABSTRACT

Methods, systems, and apparatus, including computer programs encoded on a computer storage medium, for training an action selection neural network that is used to select actions to be performed by a reinforcement learning agent interacting with an environment. In particular, the actions are selected from a continuous action space and the system trains the action selection neural network jointly with a distribution Q network that is used to update the parameters of the action selection neural network.

13 Claims, 3 Drawing Sheets

(56) References Cited

PUBLICATIONS

Hessel et al., "Rainbow: Combining Improvements in Deep Reinforcement Learning," https://arxiv.org/abs/1710.02298, Oct. 2017, 14 pages.
Horgan et al., "Distributed Prioritized Experience Replay," https://arxiv.org/abs/1803.00933, Mar. 2018, 19 pages.
Johannes et al., "An overview of the developmental process for the modular prosthetic limb," Johns Hopkins APL Technical Digest (Applied Physics Laboratory), Dec. 2011, 30(3):207-216.
Kingma et al., "Adam: A Method for Stochastic Optimization," https://arxiv.org/abs/1412.6980v8, Jul. 2015, 15 pages.
Kumar et al., "MuJoCo HAPTIX: A virtual reality system for hand manipulation," 2015 IEEE-RAS 15th International Conference on Humanoid Robots (Humanoids), Nov. 2015, 657-663.
Lillicrap et al., "Continuous control with deep reinforcement learning," https://arxiv.org/abs/1509.02971v1, Sep. 2015, 14 pages.
Lillicrap et al., "Continuous control with deep reinforcement learning," In International Conference on Learning Representations, Feb. 2016, 14 pages.
Mnih et al., "Asynchronous Methods for Deep Reinforcement Learning," International Conference on Machine Learning, Jun. 2016, 10 pages.
Mnih et al., "Human-level control through deep reinforcement learning," Nature, Feb. 2015, 518(7540):529-533.
Morimura et al., "Nonparametric Return Distribution Approximation for Reinforcement," Proceedings of the 27th International Conference on International Conference on Machine Learning, Jun. 2010, 799-806.
Morimura et al., "Parametric Return Density Estimation for Reinforcement Learning," Proceedings of the Twenty-Sixth Conference on Uncertainty in Artificial Intelligence, Jul. 2010, 8 pages.
PCT International Preliminary Report on Patentability in International Appln. No. PCT/EP2018/079526, dated May 7, 2020, 14 pages.
PCT International Search Report and Written Opinion in International Appln. No. PCT/EP2018/079526, dated Feb. 4, 2019.
Peters et al., "Natural Actor-Critic," Neurocomputing, Mar. 2008, 71(7-9):1180-1190.
Popov et al., "Data-efficient Deep Reinforcement Learning for Dexterous Manipulation," https://arxiv.org/abs/1704.03073, Apr. 2017, 12 pages.
Schaul et al., "Prioritized Experience Replay," https://arxiv.org/abs/1511.05952v4, last revised Feb. 2016, 21 pages.
Schulman et al., "Proximal Policy Optimization Algorithms," https://arxiv.org/abs/1707.06347v2, last revised Aug. 2017, 12 pages.
Schulman et al., "Trust Region Policy Optimization," Proceedings of the 32nd International Conference on Machine Learning (ICML-15), Jun. 2015, 9 pages.
Silver et al., "Deterministic policy gradient algorithms," Proceedings of the 31st International Conference on International Conference on Machine Learning, Jun. 2014, 9 pages.
Silver et al., "Mastering the game of Go with deep neural networks and tree search," Nature, Jan. 2016, 529(7587):484-489.
Sobel, "The Variance of Discounted Markov Decision Processes," Journal of Applied Probability, Dec. 1982, 19(04):794-802.
Sutton et al., "Policy Gradient Methods for Reinforcement Learning with Function Approximation," Advances in Neural Information Processing Systems, 2000, 1057-1063.
Tassa et al., "DeepMind Control Suite," https://arxiv.org/abs/1801.00690, Jan. 2018, 24 pages.
Todorov et al., "MuJoCo: A physics engine for model-based control," 2012 IEEE/RSJ International Conference on Intelligent Robots and Systems, Oct. 2012, 5026-5033.
Uhlenbeck et al., "On tire Theory of the Brownian Motion," Physical Review, Sep. 1930, 36(5):823-841.
Vecerik et al., "Leveraging Demonstrations for Deep Reinforcement Learning on Robotics Problems with Sparse Rewards," https://arxiv.org/abs/1707.08817v1, Jul. 2017, 10 pages.
Williams, "Simple Statistical Gradient-Following Algorithms for Connectionist Reinforcement Learning," Machine Learning, May 1992, 8(3-4):229-256.
Office Action in European Appln. No. 18793429.4, dated Jul. 13, 2021, 10 pages.

DISTRIBUTIONAL REINFORCEMENT LEARNING FOR CONTINUOUS CONTROL TASKS

CROSS-REFERENCE TO RELATED APPLICATIONS

This application is a National Stage Application under 35 U.S.C. § 371 and claims the benefit of International Application No. PCT/EP2018/079526, filed Oct. 29, 2018, which claims priority to U.S. Application No. 62/578,389, filed Oct. 27, 2017, the entire contents of which are hereby incorporated by reference herein.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains an action selection neural network that is used to select actions to be performed by a reinforcement learning agent interacting with an environment. In particular, the actions are selected from a continuous action space and the system trains the action selection neural network jointly with a distribution Q network that serves as the critic in a deterministic policy gradient technique.

In one aspect there is described a system for training an action selection neural network having a plurality of network parameters and used to select actions to be performed by an agent interacting with an environment. The action selection neural network is configured to receive an input observation characterizing a state of the environment and to map the input observation to an action from a continuous action space.

The system comprises one or more learner computing units wherein, during training, each of the one or more learner computing units is configured to perform learner operations.

The learner operations may comprise sampling a transition from a memory, wherein the transition includes an observation-action-reward triple and a last observation. Here the transition may represent one or more of the actions and the last observation may be an observation after the one or more actions. The observation in the triple may be an observation before the one or more actions i.e. a first observation, and the action in the triple may be an action taken in response to the first observation. If the triple represents more than one action the reward may represent the reward from more than one action, e.g. a summary of the rewards such as a time-discounted accumulation of the rewards. Thus the transition may be considered to include a sequence of observation-action-reward triples in the sense that the transition (triple) may represent such a sequence, in which case the last observation may be viewed as an observation following the last triple in such a sequence, and a distribution generated for the transition (triple) may be considered as a distribution for each triple of such a sequence. The transitions in the memory may have been generated by selecting one or more actions using the action selection neural network or a replica thereof.

The learner operations may therefore further comprise processing the observation-action pair using a distributional Q network having distributional Q network parameters, here referred to as critic parameters, to generate, for the triple, a (probability) distribution over possible returns that could result if the action is performed in response to the observation.

The learner operations may further comprise processing the last observation in the transition using a target action selection network to map the last observation to a next action, wherein the target action selection network has the same architecture as the action selection neural network but with different parameter values. As described later, the target action selection network may be periodically updated with the parameter values of the action selection neural network.

The learner operations may further comprise processing the last observation and the next action using a target distributional Q network to generate a distribution over possible returns that could result if the next action is performed in response to the last observation, wherein the target distributional Q network has the same architecture as the distributional Q neural network but with different parameter values.

The learner operations may further comprise determining a target distribution for the triple from the reward in the triple and the distribution over possible returns for the last observation, and determining an update to the critic parameters of the distributional Q network by determining a gradient of a critic objective that depends on a distance between the target distribution for the triple and the distribution generated by the distributional Q network for the triple.

The learner operations may further comprise determining an update to the action selection parameters using the distributional Q network. For example, the update to the action selection parameters may be dependent upon or proportional to an expectation value of a gradient, of the distribution output from the distributional Q network, i.e. to the gradient of a state-action value distribution defined by the distributional Q network. The gradient may be taken with respect to the output of the action selection neural network, i.e. with respect to an action predicted by the action selection neural network; optionally gradients may be averaged over a (mini) batch.

In some implementations the system further comprises a plurality of actor computing units. Each of the actor computing units may be configured to maintain a respective replica of the action selection neural network and to perform actor operations. The actor operations may comprise receiving an observation characterizing a current state of an instance of the environment, generating one of the transitions starting from the received observation by selecting actions to be performed by the agent using the action selection neural network replica and in accordance with current values of the action selection parameters, and storing the transition in the memory. The use of off-policy learning by sampling transitions from the memory facilitates running the plurality of actor computing units in parallel to collect and store experience for the one or more learner computing units. This in turn facilitates faster learning and improved performance, particularly on difficult control tasks.

In some implementations the learner operations may further comprise determining whether one or more criteria for updating the parameters of the target networks are satisfied and, when the criteria are satisfied, updating the parameters of the target networks using the critic parameters and the actor parameters. The one or more criteria may be any suitable criteria which define updating the parameters of the target networks more slowly than the updating of the critic parameters and the actor parameters, for example after a number of time or action/learning steps.

In some implementations the learner operations may further comprise determining whether one or more criteria for updating the actor computing units are satisfied and, when the criteria are satisfied, transmitting updated action selection parameters to the actor computing units. The one or more criteria may be any suitable criteria which define periodically updating the action selection parameters of the actor computing units, for example after a number of time or action/learning steps.

In some implementations the transitions in the memory are each associated with a respective priority, for example based on a temporal difference error for the transition as computed using the distributional Q network. The sampling may then be biased by the priorities for the transitions in the memory. This can help the system to learn faster and more effectively as higher error, i.e. more unexpected transitions may be sampled with higher priority.

In some implementations determining an update to the action selection parameters using the distributional Q network may comprise processing the observation in the triple using the action selection neural network to generate a predicted action for the observation, and determining a parameter update for the action selection neural network based on (i) an expectation of the gradient of the distributional Q neural network output distribution with respect to the predicted action and at the observation-predicted action input pair and (ii) the gradient of the actor neural network (continuous action) output with respect to the parameters of the actor neural network taken at the observation.

The transition may be a single step transition or an N-step transition.

In some implementations the distributions over possible returns are categorical distributions. Determining a target distribution for the triple from the reward in the triple and the distribution over possible returns for the last observation may then comprise projecting the target distribution to fall within bounds on a support of the categorical distributions prior to determining the distance measure. For example the bounds of the support of the categorical distributions may comprise a range of Q-values represented by the distributional Q network between a minimum Q-value and maximum Q-value.

In some implementations the target distribution, may satisfy:

$$Y_i = R_i + \gamma^N Z_{w'}(x_{i+N}, \pi_{\theta'}(x_{i+N})),$$

wherein $R_i$ is the reward in the triple, $\gamma$ is a discount factor constant, N is the number of steps represented by the transition, $Z_{w'}(x_{i+N}, \pi_{\theta'}(x_{i+N}))$ is the distribution over possible returns for the last observation $x_{i+N}$ in the transition if the next action $\pi_{\theta'}(x_{i+N})$ is performed in response to the last observation $x_{i+N}$.

Particular embodiments of the subject matter described in this specification can be implemented so as to realize one or more of the following advantages.

The training systems described in this specification can train neural networks that achieve state of the art performance, i.e., that perform better than conventional systems, across a wide variety of continuous control tasks, including simple control tasks, difficult manipulation tasks, and hard obstacle-based locomotion tasks. Thus, the described systems can learn effective control policies for robots performing any of a variety of tasks that require price motor control in a high-dimensional, continuous action space. The described systems can also learn effective control policies for other kinds of tasks that require precise control inputs for an agent, e.g., when the environment is an industrial facility and the agent is a control system controlling some aspect of the operation of the industrial facility, e.g., the energy efficiency or other power consumption measure.

In particular, incorporating a distributional Q network into the training of the action selection network is responsible for a large portion of the state-of-the-art performance. In particular, using the distributional Q network in place of a conventional critic network results in a better, more stable learning signal for the action selection neural network. Distributions generated by the distributional Q network model the randomness due to factors intrinsic to interacting with an environment. Among these intrinsic factors is the inherent uncertainty imposed by function approximation in a continuous action space. Better modeling of this randomness yields a distributional update that directly results in better gradients and hence improves the performance of the learning algorithm.

In some implementations, the described systems distribute and parallelize acting in the environment across multiple actor computing units, decreasing the wall clock time consumed by the training process and improving the accuracy of the resulting trained action selection neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that controls an agent that performs actions selected from a continuous, high-dimensional action space, i.e., as opposed to a lower-dimensional, discrete action space. In other words, the action space is not discretized to limit the possible choices of actions to a particular finite number. Thus, selecting an action to be performed by the agent requires selecting from a continuous space that includes a vast number of possible actions.

In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation.

In some implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. A simulated environment can be useful for training a system of the type described herein before using the system in the real world.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

Optionally, in any of the above implementations, the observation at any given time step may include data from a previous time step that may be beneficial in characterizing the environment, e.g., the action performed at the previous time step, the reward received at the previous time step, and so on.

Figure 1:
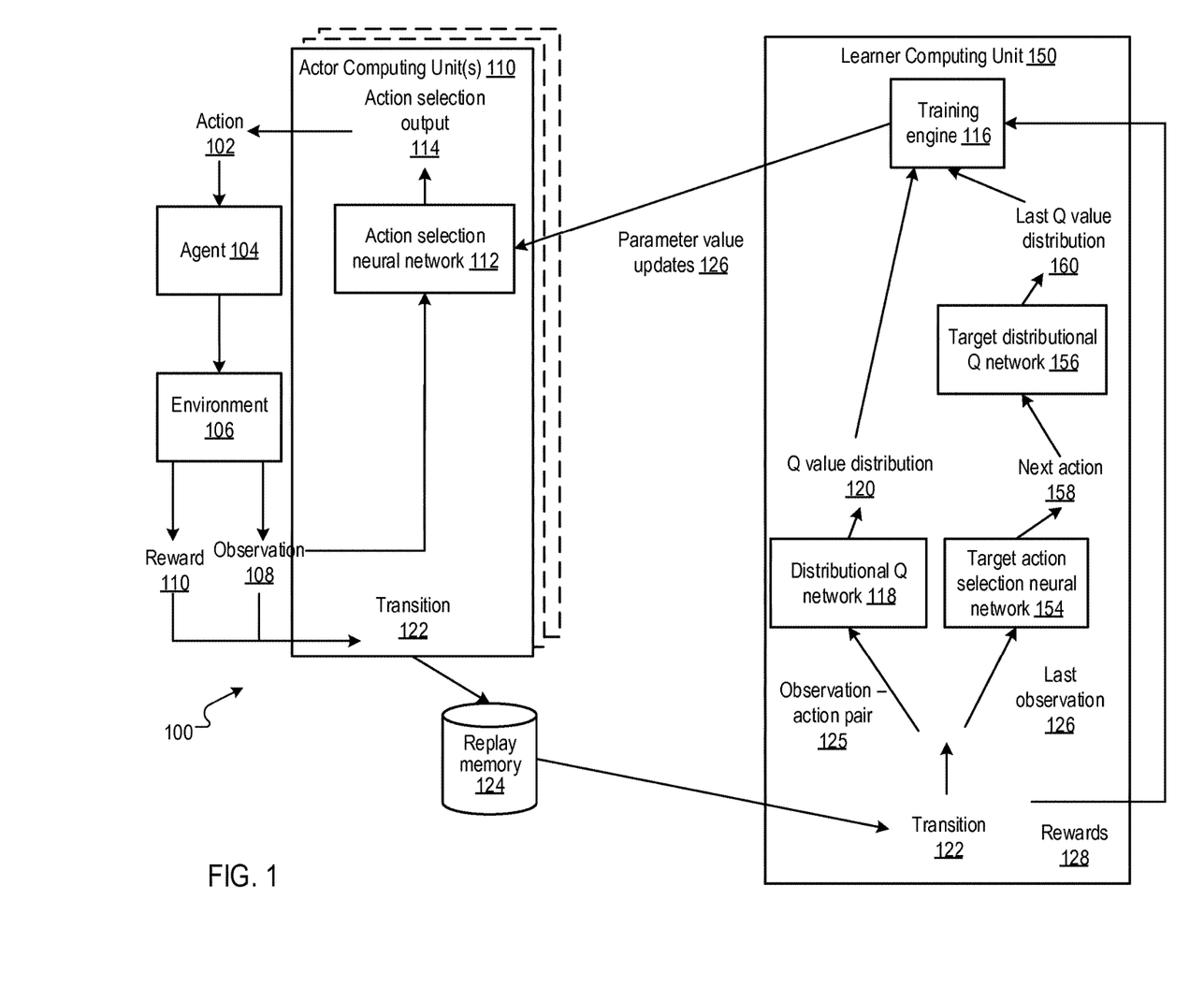
FIG. 1 is a block diagram of an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 trains an action selection neural network 112 that is used to control a reinforcement learning agent interacting with an environment.

In particular, the reinforcement learning system 100 includes an actor computing unit 110 that controls an agent 104 interacting with an environment 106, i.e., that selects actions 102 to be performed by the agent 104 as the agent 104 interacts with the environment 106 at each of multiple time steps and then causes the agent 104 to perform the selected action. The actions 102 are selected from a continuous action space of possible actions.

A computing unit may be, e.g., a computer, a core within a computer having multiple cores, or other hardware within a computer capable of independently performing operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a CPU while other computing units may be GPUs.

At each time step, the actor computing unit 110 receives an observation 108 characterizing the current state of the environment 106 and selects an action 102 to be performed by the agent 104 in response to the observation 108. At each time step, the state of the environment 106 at the time step (as characterized by the observation 108) depends on the state of the environment 106 at the previous time step and the action 102 performed by the agent 104 at the previous time step.

At each time step, the agent 104 may receive a reward 110 based on the current state of the environment 106 and the action 102 of the agent 104 at the time step. In general, the reward 110 is a numerical value. The reward 110 can be based on any event or aspect of the environment 106. For example, the reward 110 may indicate whether the agent 104 has accomplished a task (e.g., navigating to a target location in the environment 106) or the progress of the agent 104 towards accomplishing a task.

The actor computing unit 110 uses the action selection neural network 112 to select the actions 102 to be performed by the agent 104. More specifically, at each time step, the actor computing unit 110 provides a network input including the observation 108 at the time step to the action selection neural network 112.

The action selection neural network 112 is configured to process the network input in accordance with current values of the parameters of the action selection neural network (referred to in this specification as "action selection parameters") to map the observation to an action selection output 114, i.e., to an action in a continuous action space of possible actions that can be performed by the agent 104; the action may comprise one or more output values. For example, when the agent 104 is a robot, the output of the action selection neural network 112 can be a vector that specifies torques to be applied to one or more joints of the robot. As another example, when the agent 104 is controlling an industrial facility, the output of the action selection neural network 112 can be a vector that includes values that define new values for one or more controls of the industrial facility.

The actor computing unit 110 then selects the action 102 to be performed by the agent 104 at the time step based on the action identified by the action selection output 114. In some cases, the actor computing unit 110 selects the action 102 as the action identified by the action selection output 114. In some other cases, during the training of the action selection neural network 112, the actor computing unit 110 adds noise sampled from a noise distribution (optionally multiplied by a constant value) to the action identified by the action selection output 114 to generate the action 102 to be performed by the agent 104 in order to cause the agent 104 to explore the environment.

During the training of the action selection neural network 112, the actor computing unit 110 generates transitions 122 as a result of the interaction of the agent 104 with the environment 106 and stores the generated transitions 122 in a replay memory 124. The replay memory 124 may be implemented as, e.g., one or more dedicated physical storage devices or a dedicated logical storage area. Each transition 122 includes an observation-action-reward triple and a last observation.

In some implementations, the actor computing unit 110 generates single step transitions. In this case, each transition 122 the observation-action-reward triple in a transition includes data identifying an observation, an action performed by the agent in response to the observation, and a reward that was received as a result of the action being performed. The last observation in the transition is the observation that was received in response to the action in the triple being performed.

In some other implementations, the actor computing unit 110 generates N-step transitions. In these implementations, each transition 122 is a summary of a sequence of N time steps of acting in the environment, i.e., a summary of a sequence of multiple observation-action-reward triples and a last observation following the last triple in the sequence. The triples are arranged in the sequence in the order in which they occurred, i.e., so that a first action that was performed by the agent after a second action will be in a triple that follows the triple that identifies the second action in the sequence. In other words, the transition is generated from the results of the agent performing multiple actions starting from the state characterized by the first observation in the sequence. Thus, in these implementations, the triple in each transition identifies: the first observation in the sequence, the action performed by the agent in response to the first observation, and a reward that is a summary of the rewards in the multiple triples in the sequence. The last observation in the transition is the last observation following the last triple in the sequence, i.e., instead of being the observation received in response to performing the action in the triple in the transition. The summary of the rewards can be a time-discounted sum of the rewards, i.e., a sum where each reward is multiplied by a discount factor. In some implementations, the actor computing unit 110 instead includes all of the rewards in the transition that is added to the replay memory and (as will be described below) the summary is computed when the transition is used to train the action selection neural network 112.

Thus, during the training, the actor computing unit 110 repeatedly generates transitions 122 by controlling the agent and recording the results of the agent interactions and stores the transitions 122 in the replay memory 124. In some cases, as will be discussed in more detail below, each transition in the replay memory 124 is associated with a priority. In these cases, the actor computing unit 110 can also generate an initial priority for each transition and store the initial priorities in association with the corresponding transitions in the replay memory 124.

The operations performed by the actor computing unit 110 during the training of the action selection neural network 112 will be referred to in this specification as "acting in the environment." Acting in the environment will be described in more detail below with reference to FIG. 2.

In some implementations, the system 100 includes multiple actor computing units 110. In other words, in these implementations, the system 100 distributes and parallelizes acting the environment during the training of the action selection neural network. In these cases, each actor computing unit 110 maintains an identical replica of the action selection neural network 112 and uses the replica to control a corresponding instance of the agent 104 interacting with a corresponding instance of the environment 106. For example, when the agents are robots, each actor computing unit 110 uses a replica of the actor computing unit 110 to control a different robot interacting with a different instance of the environment. Additionally, each actor computing unit 110 operates asynchronously from each other actor computing 110 to repeatedly add transitions to the replay memory 124, which is accessible to all of the actor computing units 110. That is, each actor computing 110 repeatedly and independently acts in the environment to add transitions to the replay memory 124.

The reinforcement learning system 100 also includes a learner computing unit 150. During the training of the action selection neural network 112, the learner computing 150 repeatedly updates the values of the action selection parameters using transitions sampled from the replay memory 124 and provides updated action selection parameter values to each of the actor computing units 110.

In particular, the learner computing unit 150 trains the action selection neural network 112 jointly with a distributional Q neural network 118, a target action selection neural network 154, and a target distributional Q neural network 156 using reinforcement learning.

By training the action selection neural network 112, the learner computing unit 150 may cause the action selection neural network 112 to generate outputs 114 that result in the selection of actions 102 which increase a cumulative measure of reward (e.g., a time-discounted sum of future rewards) received by the agent 104. By increasing a cumulative measure of reward received by the agent 104, the training causes the agent 104 to perform given tasks more effectively.

In some implementations, the learner computing unit 150 trains the action selection neural network 112 continuously (i.e., so that the action selection parameters are constantly being updated as the agent 104 interacts with the environment 106). In some implementations, the learner computing unit 150 trains the action selection neural network 112 to determine trained values of the action selection parameters and then holds the trained values fixed. In either case, the system 100 can store the values of the action selection parameters as of a given point during the training for later use in instantiating am action selection neural network 112 or can transmit the action selection parameter values to another system for use in instantiating an action selection neural network 112, i.e., for use in controlling an agent.

The distributional Q network 118 is a neural network that is configured to process an input including an observation characterizing a state of the environment 106 and an action in accordance with current values of the parameters of the distributional Q network (referred to in this specification as "critic parameters") to generate a Q value distribution 120 for the action. A Q value distribution for an action defines a probability distribution over a set of possible Q values for the action. The Q value for an action is an estimate of a return that would result from the agent 104 performing the action in response to the observation and thereafter using the action selection neural network 112 to select future actions performed by the agent 104 in accordance with the current values of the action selection parameters. A return refers to an estimate of a cumulative measure of reward received by the agent 104, for example, a time-discounted sum of future rewards.

The probability distribution over possible Q values can be any of a variety of distributions that can be defined by the neural network output.

For example, the probability distribution can be a categorical distribution. In this example, the Q neural network can have a linear layer that projects a received input to the logits of a discrete-valued distribution defined over a fixed set of atoms followed by a softmax activation to generate a respective probability for each atom.

As another example, the probability distribution can be a mixture of Gaussians. In this example, the Q neural network has a distribution layer that maps a received input to: the mixture weight, mean, and variance for each mixture component of the mixture of Gaussians.

The target action selection neural network 154 is a neural network that has the same architecture as the action selection neural network 112 but that has different parameter values from the action selection neural network 112 at many times during the training process. Similarly, the target distributional Q neural network 156 has the same architecture as the distributional Q neural network 118 but has different parameter values from the distributional Q neural network 118 at many times during the training process. In particular, as will be described in more detail below, the learner computing unit 150 does not update the parameter values of the target networks (referred to in this specification as "target critic parameters" and "target action selection parameters," respectively) as frequently as the parameter values of the action selection neural network 112 and the distributional Q neural network 118 during the training.

The distributional Q network 118 and the action selection neural network 112 may be implemented as any appropriate deep neural network models. For example, the distributional Q network 118 and the action selection neural network 112 may be implemented as feed-forward neural networks (e.g., multi-layer perceptrons or convolutional neural networks) or recurrent neural networks (e.g., long short-term memory (LSTM) networks). In some cases, the distributional Q network 118 and the action selection neural network 112 may share one or more parameter values. A parameter value is said to be shared between two neural networks if the value of the parameter is the same for both neural networks. In particular, if a parameter value is shared between two neural networks, then changing the parameter value in one network (e.g., during training) to a new value causes the parameter value in the other network to change to the new value as well.

At each training iteration, the training engine 116 obtains a transition 122 stored in the replay memory 124. In some implementations, the training engine 116 obtains the transition 122 by sampling a transition randomly from the replay memory 124. In some other implementations, the training engine 116 obtains the transition 122 by sampling a transition from the replay memory 124 in accordance with priority values associated with the trajectories in the replay memory 124. Sampling from the replay memory 124 in accordance with priority values associated with the trajectories in the replay memory 124 is described with reference to FIG. 3.

The learner computing unit 150 determines a parameter value update 126 for the action selection parameters using the transition 122. Each parameter value update 126 can be represented in any appropriate numerical format (e.g., as a vector) and includes a respective updated value for each of the action selection parameters.

To determine the parameter value update 126 for a transition 122, the learner computing unit 150 processes the observation-action pair 125 in the transition using the distributional Q network to generate, for the triple, a Q value distribution 120 over possible returns that could result if the action is performed in response to the observation.

The learner computing unit 150 also processes the last observation 126 in the transition using the target action selection network 154 to map the last observation to a next action 158 and then processes the last observation 126 and the next action 158 using the target distributional Q network 154 to generate a last Q value distribution 160, i.e., a distribution over possible returns that could result if the next action 158 is performed in response to the last observation 126.

As will be described further below with reference to FIG. 3, a training engine 116 then uses the rewards 128 in the transition 122, the Q value distribution 120 and the last Q value distribution 160 to determine the parameter value update 126.

In some cases, the training engine 116 determines the parameter value update 126 from updates determined from multiple transitions. For example, the training engine 116 can determine a respective update for each transition in a batch of transitions and then determine the parameter value update 126 from the individual updates for the transitions in the batch.

When criteria are satisfied, e.g., when the updates for an entire batch of transitions 122 have been generated, the learner computing unit 150 provides the updated action selection parameter values to the actor computing units 110.

By repeatedly updating the action selection parameters in this manner, the learner computing unit 150 trains the action selection neural network 112 so that the network 112 can be effectively used to control the agent 104.

Figure 2:
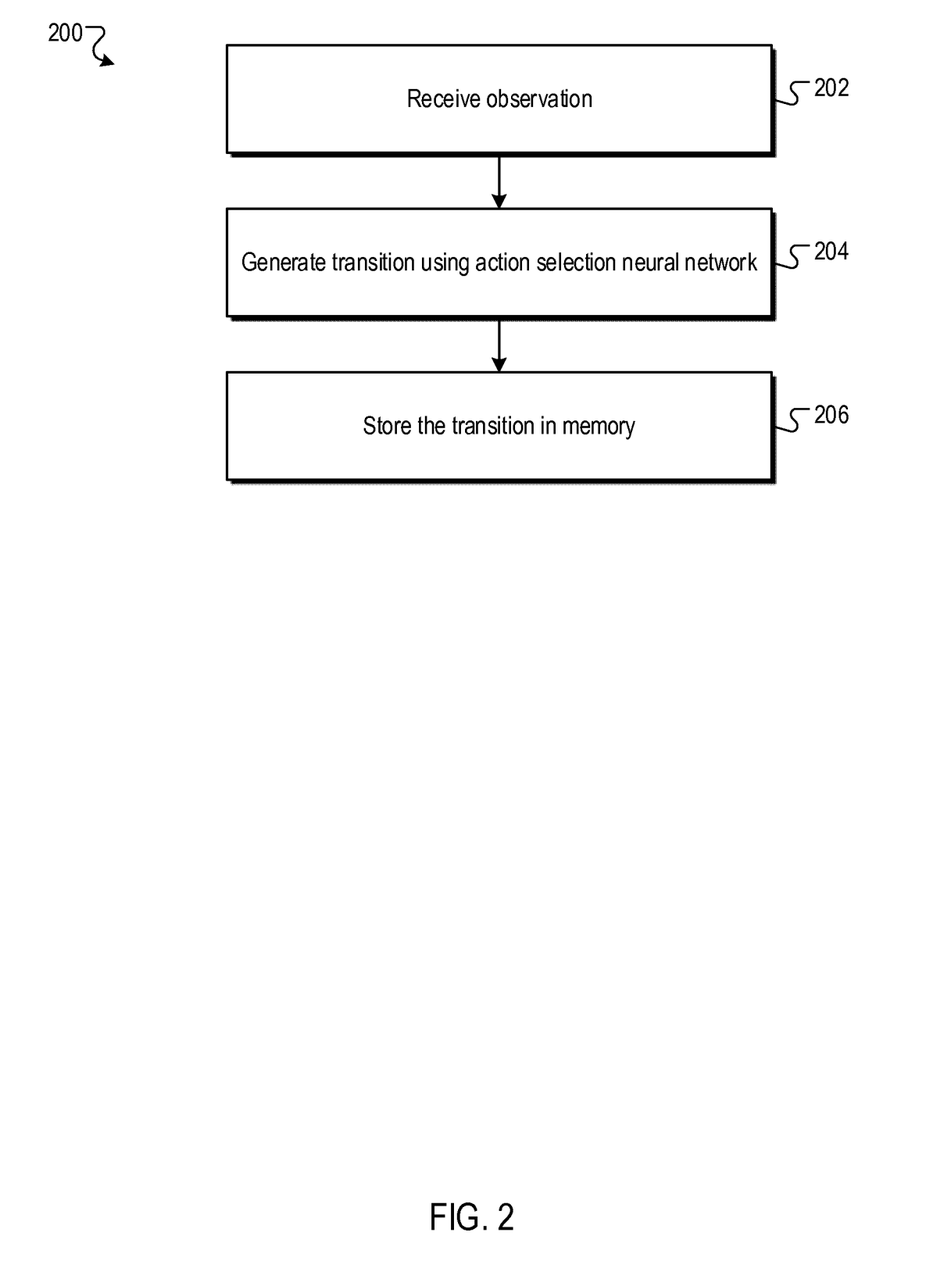
FIG. 2 is a flow diagram of an example process for acting in the environment.

FIG. 2 is a flow diagram of an example process for acting in the environment. For convenience, the process 200 will be described as being performed by a system of one or more computers located in one or more locations. For example, an actor computing unit in a reinforcement learning system, e.g., the actor computing unit 110 in the reinforcement learning system 100 of FIG. 1, appropriately programmed in accordance with this specification, can perform the process 200.

When the reinforcement learning system 100 includes multiple actor computing units, each actor computing unit can repeatedly perform the process 200 asynchronously from each other actor computing unit in the system. In other words, each actor computing unit controls a different instance of the agent interacting with a different instance of the environment and repeatedly performs the process 200 independently of each other actor computing unit.

The actor computing unit receives a current observation characterizing a current state of the environment (202).

The actor computing unit generates a transition using the action selection neural network (204). In particular, the actor computing unit selects actions to be performed by the agent using the action selection neural network until a predetermined number of actions have been performed or until the current episode of the task terminates, i.e., until the agent successfully completes the task or the environment reaches a terminal state. As described above, the transition includes an observation-action-reward triple and a last observation.

The actor computing unit stores the transition in the replay memory (206). As described above, in some cases the replay memory is prioritized, i.e., each transition in the replay memory is associated with a respective priority that is used by the learner computing unit when sampling from the replay memory. In these cases, the actor computing also generates a priority for the transition and stores the priority in association with the transition in the replay memory. In some implementations, the priority is a default placeholder priority, i.e., a default high priority that results in newly added transitions being sampled more frequently from the replay memory. In some other implementations, the actor computing unit can maintain an instance of the distributional Q network and can determine the priority based on the temporal difference (TD) error for the transition as computed using the distributional Q network. For example, the priority can be the absolute value of the TD error. Determining the TD error will be described in more detail below with reference to FIG. 3.

Figure 3:
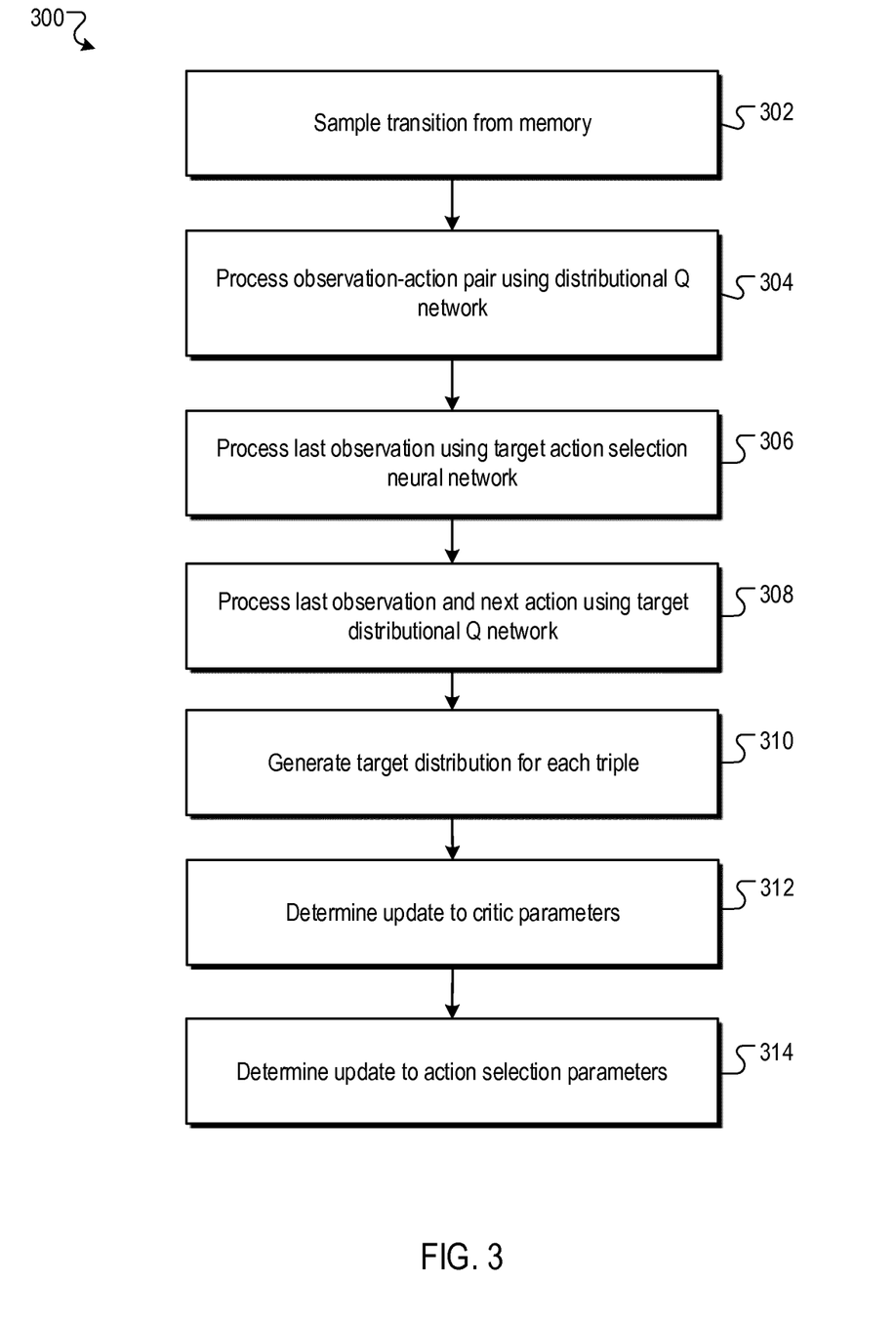
FIG. 3 is a flow diagram of an example process for updating the action selection parameters and the critic parameters.

FIG. 3 is a flow diagram of an example process for updating the action selection parameters and the critic parameters. For convenience, the process 300 will be described as being performed by a system of one or more computers located in one or more locations. For example, a learner computing unit in a reinforcement learning system, e.g., the learner computing unit 150 in the reinforcement learning system 100 of FIG. 1, appropriately programmed in accordance with this specification, can perform the process 300.

The learner computing unit can repeatedly perform the process 300 to repeatedly update the action selection and critic parameters during the training of the action selection neural network.

The learner computing unit samples a batch of transitions from the replay memory (302). As described above, each sampled transition includes an observation-action-reward triple and a last observation. In some cases, the last observation immediately followed the observation in the triple while acting in the environment. In other cases, the system uses N-step transitions and the reward in the triple is a time-discounted sum of multiple rewards from multiple intermediate time steps and the last observation occurred multiple time steps after the observation in the triple while acting in the environment.

In some implementations, the learner computing unit samples the transitions randomly from the transitions currently in the replay memory.

In other implementations, the transitions in the replay memory are each associated with a respective priority, and the sampling is biased by the priorities for the transitions. More specifically, the probability of sampling a transition can be defined as $p_k^\alpha/\Sigma_k p_k^\alpha$ where $p_k^\alpha$ is the priority of the transition and $\Sigma_k p_k^\alpha$ is the sum of all priorities in the shared memory, where each priority is raised to a fixed exponent $\alpha$. The exponent $\alpha$ controls the amount of prioritization. When $\alpha$ is zero, the sampling is uniform. As described later, the bias that this introduces can be compensated by weighting the critic update by $1/Rp_i$ where R is the size of the replay memory.

For each transition, the learner computing unit processes the observation-action pair in triple in the transition using the distributional Q network and in accordance with current values of the critic parameters to generate, for the triple, a distribution over possible returns that could result if the action is performed in response to the observation (304).

For each transition, the learner computing unit processes the last observation in the transition using the target action selection network and in accordance with current values of the target action selection parameters to map the last observation to a next action (306).

For each transition, the learner computing unit processes the last observation in the sequence and the next action using the target distributional Q network and in accordance with current values of the target critic parameters to generate a distribution over possible returns that could result if the next action, i.e., the action that was generated using the target action selection network in step 306, is performed in response to the last observation in the sequence (308).

For each transition, the learner computing unit determines a target distribution for the triple in the sequence from the reward in the triple in and the distribution over possible returns for the last observation (310). That is, when generating the target distribution for a given triple, the learner computing unit considers only the rewards for the given triples and the rewards for triples that are after the given triple in the sequence. In particular, in some implementations the target distribution $Y_i$ for the i-th transition in a batch satisfies:

$$Y_i = (\Sigma_{n=0}^{N-1} \gamma^n r_{i+n}) + \gamma^N Z_{w'}(x_{i+N}, \pi_{\theta'}(x_{i+N})),$$

where $\gamma$ is a discount factor constant, $r_{i+n}$ is the reward received in response to the n-th action taken in the sequence corresponding to the i-th transition, $Z_{w'}(x_{i+N}, \pi_{\theta'}(x_{i+N}))$ is the distribution over possible returns for the last observation $x_{i+N}$ in the i-th transition if the next action $\pi_{\theta'}(x_{i+N})$ is performed in response to the last observation $x_{i+N}$. Here the primed values refer to parameters of the target neural networks and thus $\theta'$ denotes parameters of the target action selection (policy) neural network and w' denotes parameters of the target distributional Q (value) neural network.

As described above, in some cases the sampled transition already includes the time discounted sum $\Sigma_{n=0}^{N-1} \gamma^n r_{i+n}$ while in other cases the sampled transition includes the individual rewards and the learner computing unit computes the sum as part of determining the target distribution. When the transitions are single step transitions, the time discounted sum $\Sigma_{n=0}^{N-1} \gamma^n r_{i+n}$ is replaced with a single $\gamma r_i$ term because there is only one reward $r_i$ being considered for each transition.

In some cases, e.g., when the distribution is a categorical distribution, after the sum is computed, the target distribution $Y_i$ has a different set of atoms than the Q value distributions that are generated by the distributional Q network, i.e., the target distribution does not fall within the bounds of the support of the categorical distributions generated by the distributional Q network. In these cases, the learner computing unit projects the target distribution $Y_i$ so that the distribution falls within the bounds on the support of the categorical distributions after the discounted rewards are added. Projecting a target distribution in this manner is described in Marc G Bellemare, Will Dabney, and Remi Munos. A distributional perspective on reinforcement learning. In International Conference on Machine Learning, pp. 449-458, 2017.

The learner computing unit determines an update to the critic parameters of the distributional Q network by determining a gradient of a critic objective (312). In particular, the critic objective depends on, for each transition, a distance between the target distribution for the triple in the transition and the distribution generated by the distributional Q network for the triple. In some implementations, the update $\delta_W$ to the critic parameters w satisfies:

$$\delta_w = \frac{1}{M} \sum_i \nabla_w (Rp_i)^{-1} d(Y_i, Z_w(x_i, a_i))$$

where M is the total number of transitions in the batch of transitions currently being processed by the learner computing unit, the sum over i is a sum over the M transitions in the batch, the gradient $\nabla$ is taken with respect to the critic parameters w, R is the size of the replay memory, $p_i$ is the priority assigned to the transition in the replay memory, d is a distance measure between two probability distributions, e.g., the KL divergence between the two distributions or the cross-entropy term of the KL divergence, $Y_i$ is the target distribution (or the projected target distribution, if the target distribution is projected as described above) for the i-th transition in the batch, and $Z_w(x_i, a_i)$ is the distribution generated by the distributional Q network for the triple in the i-th transition in the batch. When sampling from the replay memory is random, $Rp_i$ is equal to one for all transitions in the replay memory.

The learner computing unit determines an update to the action selection parameters using the distributional Q network (314).

In particular, the learner computing unit determines a respective parameter update to the action selection parameters for each transition and then combines the parameter updates to determine a parameter value update for the transition.

To generate the parameter update for transition, the learner computing unit processes the given observation in the triple in the transition using the action selection neural network and in accordance with current values of the action selection parameters to generate a predicted action for the given observation.

The learner computing unit then determines the parameter update based on (i) an expectation of the gradient of the distributional Q neural network with respect to the predicted action and at the given observation-predicted action input pair and (ii) the gradient of the action selection neural network with respect to the parameters of the action selection neural network taken at the given observation.

In particular, in some implementations the update $\delta_\theta$ satisfies:

$$\delta_\theta = \frac{1}{M}\left(\sum_i \nabla_\theta \pi_\theta(x_i) E[\nabla_a Z_w(x_i, a)]\bigg|_{a=\pi_\theta(x_i)}\right),$$

where M is the total number of transitions in the batch of transitions currently being processed by the learner computing unit, the sum over i is a sum over the M transitions in the batch, $\nabla_\theta$ is the gradient taken with respect to the critic parameters $\theta$, E is the expectation operator, and $\nabla_a Z_w(x_i, a)]|_{a=\pi_\theta(x_i)})$ is the gradient of the distributional Q neural network Z with respect to the predicted action a and at the given observation-predicted action input pair $x_i$, a, and the sum is over all of the triples in the sequence.

Once the learner computing unit has determined the updates for each transition in the current batch, the learner computing unit updates the current values of the critic parameters and the action selection parameters, e.g., by applying the updates to the current values of the corresponding parameters in accordance with update rule being used for the training. For example, the update rule may be an ADAM update rule, an rmsprop update rule, or a stochastic gradient descent update with learning rate update rule.

When priorities are used to sample transitions from the memory, the learner computing unit can determine for each sampled transition a respective updated priority and then update the replay memory to associate the updated priorities with the sampled transitions. For example, the learner computing unit can determine a learning error for each sampled transition and determine the priority from the learning error. For example, the learner computing unit can determine a temporal difference (TD) error for each sampled transition and determine the priority for each sampled transition from the TD error. For instance, the priority can be an absolute value of the TD error. The TD error for transition i can be equal to the distance measure $d(Y_i, Z_w(x_i, a_i))$ described above.

To maintain the capacity of the replay memory within a threshold, the learner computing unit can optionally determine whether criteria for removing any transitions from the shared memory are satisfied. When the criteria are satisfied, the learner computing unit updates the replay memory to remove one or more of the transitions from the replay memory.

For example, after performing a certain number of learning steps (e.g., after every 50, 100, 200, or 500 steps), the learner computing unit can check whether the capacity threshold of the replay memory has been reached. If the capacity threshold is reached, the learner computing unit can remove one or more transitions from the replay memory, for example, in a first in first out order to maintain the capacity within the threshold.

The learner computing unit also determines whether criteria for updating the actor computing units are satisfied. When the criteria are satisfied, the learner computing unit can transmit the updated action selection parameter values to the actor computing units. For example, the learner computing unit can update the actor computing units after the learner computing units have performed a predetermined number of learning steps (e.g., after every learning step or after 10, 20, 50, 100, or 200 steps), or after a predetermined time period has passed (e.g., after 1, 2, 2.5, 2.8, or 5 seconds).

The learner computing unit also determines whether criteria for updating the target network parameters are satisfied. When the criteria are satisfied, the learner computing unit can set the target parameter values for the target action selection neural network and the distributional Q network to be the updated action selection parameter values and the updated critic parameter values, respectively. For example, the learner computing unit can update the target parameters after the learner computing units have performed a predetermined number of learning steps (e.g., 50, 100, or 200 steps), or after a predetermined time period has passed (e.g., after 1, 2, 2.5, 2.8, or 5 seconds). Thus, while the action selection parameters and the critic parameter values are updated every learning step, the target values are updated less frequently, resulting in the target parameter values changing more slowly during the training.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system for training an action selection neural network having a plurality of network parameters and used to select actions to be performed by an agent interacting with an environment, wherein the action selection neural network is configured to receive an input observation characterizing a state of the environment and to map the input observation to an action from a continuous action space, the system comprising:
one or more learner computing units, wherein each of the one or more learner computing units is configured to perform learner operations comprising:
sampling a transition from a memory, wherein the transition includes an observation-action-reward triple and a last observation;
processing the observation-action pair using a distributional Q network having critic parameters to generate, for the triple, a distribution over possible returns that could result if the action is performed in response to the observation;
processing the last observation in the transition using a target action selection network to map the last observation to a next action, wherein the target action selection network has the same architecture as the action selection neural network but with different parameter values;
processing the last observation and the next action using a target distributional Q network to generate a distribution over possible returns that could result if the next action is performed in response to the last observation, wherein the target distributional Q network has the same architecture as the distributional Q network but with different parameter values;
determining a target distribution for the triple from the reward in the triple and the distribution over possible returns for the last observation;
determining an update to the critic parameters of the distributional Q network by determining a gradient of a critic objective that depends on a distance between the target distribution for the triple and the distribution generated by the distributional Q network for the triple; and
determining an update to the action selection parameters using the distributional Q network.

2. The system of claim 1, further comprising:
a plurality of actor computing units, each of the actor computing units configured to maintain a respective replica of the action selection neural network and to perform actor operations comprising:
receiving an observation characterizing a current state of an instance of the environment,
generating a transition starting from the received observation by selecting actions to be performed by the agent using the action selection neural network replica and in accordance with current values of the action selection parameters, and
storing the transition in the memory.

3. The system of claim 1, wherein the learner operations further comprise:
determining whether one or more criteria for updating the parameters of the target networks are satisfied; and
when the criteria are satisfied, updating the parameters of the target networks using the critic parameters and the action selection parameters.

4. The system of claim 2, wherein the learner operations further comprise:
determining whether one or more criteria for updating the actor computing units are satisfied; and
when the criteria are satisfied, transmitting updated action selection parameters to the actor computing units.

5. The system of claim 1, wherein the transitions in the memory are each associated with a respective priority, and wherein the sampling is biased by the priorities for the transitions in the memory.

6. The system of claim 1, wherein determining an update to the action selection parameters using the distributional Q network comprises:
processing the observation in the triple using the action selection neural network to generate a predicted action for the observation; and
determining a parameter update for the action selection neural network based on (i) an expectation of the gradient of the distributional Q network output with respect to the predicted action and at the observation-predicted action input pair and (ii) the gradient of the actor neural network output with respect to the parameters of the action selection neural network taken at the observation.

7. The system of claim 1, wherein the transition is a single step transition.

8. The system of claim 1, wherein the transition is an N-step transition.

9. The system of claim 1, wherein the distributions over possible returns are categorical distributions, and wherein determining the target distribution for the triple from the reward in the triple and the distribution over possible returns for the last observation comprises:
projecting the target distribution to fall within bounds on a support of the categorical distributions prior to determining the distance.

10. The system of claim 1, wherein the target distribution $Y_i$ satisfies:
$Y_i = R_i + \gamma^N Z_{w'}(x_{i+N}, \pi_{\theta'}(x_{i+N}))$, wherein $R_i$ is the reward in the triple, wherein $\gamma$ is a discount factor constant, N is the number of steps represented by the transition, $Z_{w'}(x_{i+N}, \pi_{\theta'}(x_{i+N}))$ is the distribution over possible returns for the last observation $x_{i+N}$ in the transition if the next action $\pi_\theta(x_{i+N})$ is performed in response to the last observation $x_{i+N}$.

11. A computer-implemented method for training an action selection neural network having a plurality of network parameters and used to select actions to be performed by an agent interacting with an environment, wherein the action selection neural network is configured to receive an input observation characterizing a state of the environment and to map the input observation to an action from a continuous action space, the method comprising:

sampling a transition from a memory, wherein the transition includes an observation-action-reward triple and a last observation;

processing the observation-action pair using a distributional Q network having critic parameters to generate, for the triple, a distribution over possible returns that could result if the action is performed in response to the observation;

processing the last observation in the transition using a target action selection network to map the last observation to a next action, wherein the target action selection network has the same architecture as the action selection neural network but with different parameter values;

processing the last observation and the next action using a target distributional Q network to generate a distribution over possible returns that could result if the next action is performed in response to the last observation, wherein the target distributional Q network has the same architecture as the distributional Q network but with different parameter values;

determining a target distribution for the triple from the reward in the triple and the distribution over possible returns for the last observation;

determining an update to the critic parameters of the distributional Q network by determining a gradient of a critic objective that depends on a distance between the target distribution for the triple and the distribution generated by the distributional Q network for the triple; and determining an update to the action selection parameters using the distributional Q network.

12. The computer-implemented method of claim 11, further comprising: receiving an observation characterizing a current state of an instance of the environment, generating a transition starting from the received observation by selecting actions to be performed by the agent using the action selection neural network replica and in accordance with current values of the action selection parameters, and storing the transition in the memory.

13. One or more non-transitory computer-readable storage media storing instructions that when executed by one or more computers cause the one or more computers to perform operations for training an action selection neural network having a plurality of network parameters and used to select actions to be performed by an agent interacting with an environment, wherein the action selection neural network is configured to receive an input observation characterizing a state of the environment and to map the input observation to an action from a continuous action space, the operations comprising:

sampling a transition from a memory, wherein the transition includes an observation-action-reward triple and a last observation;

processing the observation-action pair using a distributional Q network having critic parameters to generate, for the triple, a distribution over possible returns that could result if the action is performed in response to the observation;

processing the last observation in the transition using a target action selection network to map the last observation to a next action, wherein the target action selection network has the same architecture as the action selection neural network but with different parameter values;

processing the last observation and the next action using a target distributional Q network to generate a distribution over possible returns that could result if the next action is performed in response to the last observation, wherein the target distributional Q network has the same architecture as the distributional Q network but with different parameter values;

determining a target distribution for the triple from the reward in the triple and the distribution over possible returns for the last observation;

determining an update to the critic parameters of the distributional Q network by determining a gradient of a critic objective that depends on a distance between the target distribution for the triple and the distribution generated by the distributional Q network for the triple; and determining an update to the action selection parameters using the distributional Q network.

* * * * *